United States Patent
Kleyer

(10) Patent No.: US 7,805,716 B2
(45) Date of Patent: Sep. 28, 2010

(54) METHOD FOR EXECUTING A FIRST SOFTWARE PROGRAM, DEVELOPED FOR A STORED-PROGRAM CONTROLLER, ON A COMPUTER

(75) Inventor: Dieter Kleyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 734 days.

(21) Appl. No.: 10/461,377

(22) Filed: Jun. 16, 2003

(65) Prior Publication Data
US 2004/0111716 A1 Jun. 10, 2004

(30) Foreign Application Priority Data
Dec. 10, 2002 (EP) .................................. 02027701

(51) Int. Cl.
*G06F 9/45* (2006.01)
*G06F 9/44* (2006.01)
*G06F 7/38* (2006.01)

(52) U.S. Cl. .................... 717/152; 717/154; 714/724; 712/220

(58) Field of Classification Search .................. 717/136
See application file for complete search history.

(56) References Cited

U.S. PATENT DOCUMENTS

| | | | | |
|---|---|---|---|---|
| 4,969,083 | A * | 11/1990 | Gates | 700/18 |
| 5,225,975 | A * | 7/1993 | Gates et al. | 700/18 |
| 6,161,196 | A * | 12/2000 | Tsai | 714/10 |
| 6,618,817 | B1 * | 9/2003 | Armstrong | 714/4 |
| 6,701,515 | B1 * | 3/2004 | Wilson et al. | 717/117 |
| 6,819,960 | B1 * | 11/2004 | McKelvey et al. | 700/17 |
| 7,080,365 | B2 * | 7/2006 | Broughton et al. | 717/146 |
| 7,134,118 | B1 * | 11/2006 | McNutt | 717/138 |
| 7,203,931 | B2 * | 4/2007 | Minamide et al. | 717/136 |
| 2001/0037489 | A1 * | 11/2001 | Stripf et al. | 717/1 |
| 2002/0059567 | A1 * | 5/2002 | Minamide et al. | 717/151 |
| 2003/0061274 | A1 * | 3/2003 | Lo | 709/203 |

FOREIGN PATENT DOCUMENTS

DE 196 17 842 A1 11/1997

OTHER PUBLICATIONS

"Compact Timed Automata for PLC Programs", H.X. Willems, Nov. 1999, pp. 1-24, <ftp://ftp.inrialpes.fr/pub/vasy/publications/others/Willems-99.pdf>.*

"Re-usable software design for programmable logic controllers", Bonfatti et al., Nov. 1995, pp. 31-40, <http://delivery.acm.org/10.1145/220000/216651/p31-bonfatti.pdf>.*

(Continued)

*Primary Examiner*—Tuan Q Dam
*Assistant Examiner*—Thuy Dao
(74) *Attorney, Agent, or Firm*—Harness, Dickey & Pierce, P.L.C.

(57) ABSTRACT

A first software program may be read in by way of a compiler, which is included in a computer, and is converted into a second software program that may be executed by the computer. This second software program may be executed on the computer so that a control function of a stored-program controller can be taken over by a computer by way of a particular process.

16 Claims, 1 Drawing Sheet

OTHER PUBLICATIONS

"An improved process for the development of PLC software", Bonfatti et al., May 1997, pp. 400-410, <http://delivery.acm.org/10.1145/260000/253365/p400-bonfatti.pdf>.*

"Model-based generation of modular PLC code using IEC61131 function blocks", Thieme et al., Nov. 2002, pp. 199-224, <http://ieeexplore.ieee.org/stamp/stamp.jsp?tp=&arnumber=1026065>.*

"PCS and Smart I/0 Invade PLC Territory" 1 & CS—Industrial and Process Control Magazine, XP000508356, May 1995, pp. 53-56.

"SPS-Compiler für Industrielle 80×86-Systeme" Elektronik 1993, Franzis Verlag GmbH, XP000374511, pp. 44-88 and English Translation.

* cited by examiner

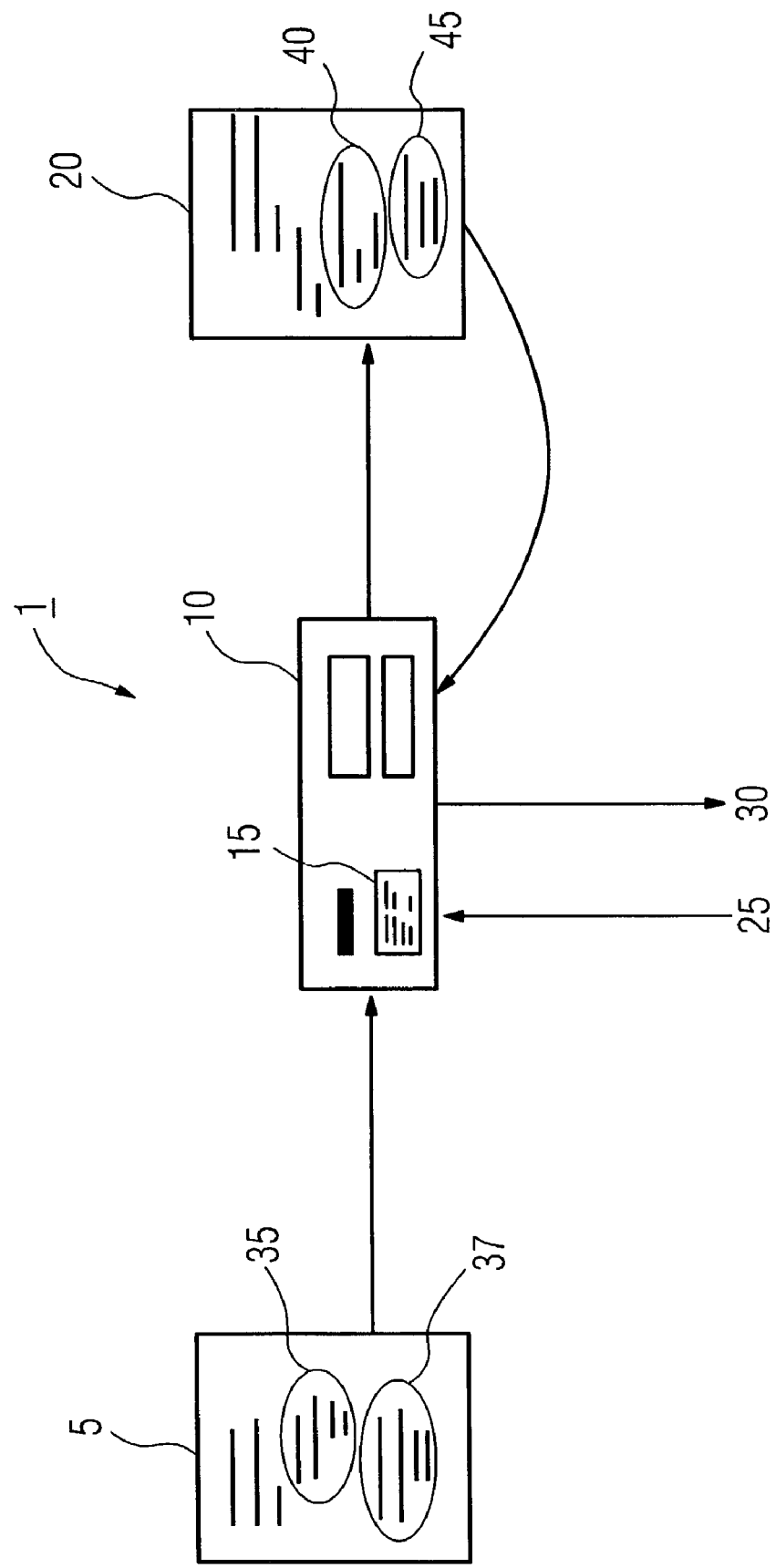

METHOD FOR EXECUTING A FIRST SOFTWARE PROGRAM, DEVELOPED FOR A STORED-PROGRAM CONTROLLER, ON A COMPUTER

The present application hereby claims priority under 35 U.S.C. §119 on European patent application number EP 02027701.8 filed Dec. 10, 2002, the entire contents of which are hereby incorporated herein by reference.

FIELD OF THE INVENTION

The present invention generally relates to a method for executing a software program, developed for a stored-program controller, on a computer.

BACKGROUND OF THE INVENTION

In order to control processes in process engineering, use is often made of known stored-program controllers (SPCs) which have been developed and constructed specially for this purpose. The strengths of such controllers are their particular suitability in terms of processing typical process control tasks such as, for example, collection of measurement data, logic linking, regulation and actuation of final controlling elements. For this purpose, various manufacturers have developed systems having a number of plug-in cards which are each specialized for specific functions.

A task which is to be processed specifically in software terms is then processed by way of a corresponding software program which is loaded into the stored-program controller.

For a long time, stored-program controllers were superior to what are referred to as universal computers (personal computers) in process engineering controllers, in particular with respect to processing speed and fail-safety.

The performance capability of such personal computers which are constructed from standard hardware is increasing at ever shorter time intervals. The performance advantages of stored-program controllers in process engineering control functions are thus becoming smaller and smaller.

Owing to the widespread distribution of personal computers, their standard hardware components and their favorable prices, it is desirable if software programs which have been developed for a stored-program controller can be executed on personal computers in order to make it possible to use the latter for process controllers.

A significant problem here is that the system requirements in terms of hardware and software of stored-program controllers and personal computers have basic differences so that, if a software program which has been developed for a stored-program controller is to be executed on a personal computer, it is usually necessary to completely redevelop a corresponding software program for the personal computer. Here, it is usually possible to use only the basic solution approach of the software program for the stored-program controller, but not reuse its specific program structure and implementation. Such a software program for the personal computer is therefore virtually a complete redevelopment which requires corresponding quality assurance.

SUMMARY OF THE INVENTION

An object of the present invention is to provide a method which is as low as possible in expenditure and by way of which a control program for a stored-program-controller can be executed on a computer, such as a personal computer.

An object of the present invention is achieved by way of a method for executing a first software program, which is developed for a stored-program controller, on a computer. The method may include:

1. A first software program is read in by way of a compiler which is included in a personal computer, and is converted into a second software program which can be executed by the personal computer.

2. The second software program is executed on the personal computer.

The compiler makes use of as much information from the first software program as possible, for example its specific design and/or operating properties. The first software program is therefore mapped onto the second software program while preserving its specific structural properties by way of the compiler, with the result that it is unnecessary to perform essentially manual regeneration of the second software program.

As a result, the need for renewed quality assurance measures for the second software program is also dispensed with as no steps which might involve errors are involved in its essentially automatic generation.

It is thus possible to obtain for a software program for a stored-program controller, a corresponding, quality-assured second software program which can be executed on a personal computer.

In a known, stored-program controller, an operating system performs the function of executing the first software program. As the operating system of a personal computer cannot directly execute this first software program, the compiler is necessary; this can be embodied, for example, as an interpreter.

The use of an interpreter provides the advantage that a loaded, first software program can be executed immediately by way of a step-by-step translation of its control instructions into the second software program without the complete translation of the first software program into the second software program being necessary in advance.

When a compiler is used, the first software program is translated essentially completely into the second software program before it is executed on the personal computer. The significant advantage of a compiler is that the second software program, once compiled, does not need to be compiled/translated again when it is executed on the personal computer again. Furthermore, the processing speed which can be achieved by means of a compiled software program is very high, as the compiled second software program is present in machine-readable code which can be processed by the personal computer without intermediately connected further translation mechanisms.

In one advantageous refinement of the present invention, the first software program includes at least one program module and/or functional module, and the compiler respectively converts the program module and/or functional module into a first type of data code.

The actual technological control functions are executed using program and functional modules in known computer programs for stored-program controllers. In this embodiment of the present invention, these control functions are converted into a specific, first type of data code so that the parts of the first software program which relate to the aforesaid control functions are included in the second software program in the form of a specific file type; the first type of data code advantageously includes here the class of DLL (Direct Link Library) files. These are software routines which are integrated into the sequencing of the application program during its running time.

The use of DLL files is widespread in conjunction with the processing of application programs on personal computers. This embodiment of the present invention is therefore particularly suitable for executing the second software program on a personal computer.

In a further embodiment of the present invention, the first software program includes at least one organization module, and the compiler converts the organization module into a second type of data code.

In known control systems for stored-program controllers, organization modules are used, for example for their cyclical operation, for timed processing, for event-controlled processing and for processing starting up and re-starting up programs.

In this embodiment of the present invention, organization modules are converted into a second type of file, in particular into the class of programs which can be executed directly on a personal computer, comprising what are referred to as EXE and/or BAT files. Such files are included here in the second software program.

In control systems for stored-program controllers, the organization modules essentially perform the task of program sequencing control and are consequently executed in particular when the control program starts up or restarts up or when defined peripheral conditions occur. In contrast to the program modules and functional modules, the organization modules do not have the software solution of a technical task, for example a control algorithm, stored in them, but instead its management. The generation of directly executable programs from the organization modules provides, when a personal computer is used, in particular the advantage that the starting of the second software program on the personal computer can be carried out simply by calling the directly executable file which corresponds to a specific organization module, without a specific sequencing environment having to be installed for this purpose on the personal computer.

Furthermore, it is advantageous if the first software program includes at least one data module, and a memory module, formed by way of the data module or modules, of the stored-program controller is represented on the personal computer.

This makes it possible for instructions of the first software program which include access to data contained in data modules to be appropriately implemented on the personal computer without it being necessary, for this purpose, to change the structure of such instructions or intermediate translation steps.

In particular, an instruction, included in the first software program, for access to one of the data modules is not changed by the compiler so that a direct access to data of the memory module which is represented on the personal computer can be made by way of the instruction. Therefore, in this embodiment of the present invention, an instruction relating to the access to a data module (for example "A DB 100") is not changed by the compiler as such an instruction cannot be executed directly on the personal computer owing to the mapping of the memory module of the stored-program controller onto the personal computer.

In one particularly advantageous refinement of the invention, a plurality of first software programs which have been developed for stored-program controllers are converted into corresponding second software programs, each second software program being executed as a separate process on the personal computer.

Known stored-program controllers can generally process only one control program; however, in this embodiment of the invention, the quasi-parallel processing of a plurality of such programs on a personal computer is possible as each first software program is assigned a separate process and all these processes can thus be carried out in a quasi-parallel fashion. The use of computer resources is particularly high in this embodiment.

The first software programs are advantageously originally provided here, before their conversion into the corresponding second software programs, for a plurality of CPUs of corresponding stored-program controllers and one file which can be executed directly on the personal computer is generated per CPU by the compiler.

Therefore, in this embodiment of the present invention, the functions of a plurality of CPUs for stored-program controllers can be taken over by a personal computer which usually includes just one CPU. Calling onto the personal computer a control program which is assigned to a specific CPU for a stored-program controller is then carried out simply by loading the corresponding file which is generated by the compiler and can be executed directly.

The sequences of the processes on the personal computer are advantageously coordinated by way of at least one semaphore.

As a plurality of processes cannot actually be processed in parallel, but rather only alternately, on a personal computer. In this embodiment of the present invention, a semaphore is provided which respectively assigns a specific processing time to the processes and triggers their alternating processing so that parallel processing of the processes apparently takes place.

Communication between the processes on the personal computer advantageously takes place by way of a pipe and/or a memory mapped file.

In a further embodiment of the present invention, a cyclically running component of the first software program is converted by the compiler into a thread which is included in the second software program.

Threads are known to be capable of converting control flows, which run in a quasi-parallel way, within a program.

The execution of the thread on the personal computer is advantageously interrupted, when necessary, by event-controlled components of the second software program.

A control program for a stored-program controller generally includes a plurality of program sections which run cyclically and whose processing is interrupted, when necessary, for example when there is an operational fault in the technical system to be controlled, in order to place the technical system in a safe operating state.

This functionality of the control program for a stored-program controller is implemented in an embodiment of the present invention by executing the thread which can be interrupted by event-controlled components of the second software program.

In another advantageous embodiment of the present invention, a cyclically running component of the first software program is executed on the personal computer after conversion of the first software program into the second software program after execution of event-controlled components of the second software program.

Here, for example, functions which are noncritical in terms of time are called after timed functions. This embodiment provides in particular the advantage that frequent changing between processes is avoided as the functions which are less important (noncritical in terms of time) are carried out only after the timed functions and the latter are therefore not continuously interrupted by processes which only relate to functions which are uncritical in terms of time.

Communication advantageously takes place between the personal computer and a process control system by way of a TCP/IP and/or an Ethernet communications protocol and/or a serial interface.

This embodiment permits the personal computer to be connected to a process control system so that a control hierarchy can be formed for a technical system.

In one further advantageous refinement of the present invention, hardware components of the personal computer are present redundantly.

In many technical applications, in particular the availability and the fail-safety of the control system and/or process control system are highly significant. For example, the control and monitoring of critical processes of the technical system requires the control system to be permanently available so that the process which is to be controlled does not get out of control.

It is advantageous here if, in the event of a fault in a hardware component of the personal computer, virtually uninterrupted switching over to the corresponding redundant component takes place.

Components may be here, for example, the central processing unit, the hard disk drive or input and output units.

Automatic switching over from a defective component to a corresponding component which is ready for operation permits virtually uninterrupted further operation of the control system and thus of the technical system.

For this purpose, the personal computer may include, in particular, a fault tolerant server. Such servers are known and provide the hardware and software platform for highly available PC-based control systems. Especially in applications in the field of finances, which make extremely high requirements of the fail-safety of the systems, such fault tolerant servers have already proven valuable.

In a fault tolerant server, its hardware is of redundant design, and therefore all the components are present in duplicate or even multiply. In the case of a fault, the corresponding redundant hardware component is switched over to without effects and delays which are noticeable to the process. Furthermore, specific hardware components are exchanged under voltage so that it is not necessary to interrupt the power supply of the fault tolerant server and its operation therefore does not need to be interrupted.

Switching over to a redundant component in a fault tolerant server is a system property of such a server so that, when a fault tolerant server is used in the method according to the present invention, it is not necessary to make any additional expenditure on the implementation of this functionality.

The term "personal computer" in conjunction with the presentation of the method according to the present invention and its advantageous refinements is intended to include a computer system which is constructed essentially from standard components which are widespread and used, for example, in normal office computers or in the private sphere. The intention here is that, in contrast to known stored-program controllers, the components and systems or subsystems are not ones which are specially developed for control tasks.

A personal computer in the sense of the present invention does not need to be constructed ready for application in such a way that a user can, for example, input data directly into the personal computer, process it and view it on a screen. Input devices such as, for example, a keyboard or mouse and output devices such as, for example, a screen can be present, but do not need to be so.

Similarly to known stored-program controllers, when a method according to the present invention is used, data is often not input directly into the personal computer by a user but rather transmitted to the personal computer by way of a bus system, for example. Furthermore, data which is acquired by the personal computer is usually not displayed directly but rather transferred to a further computer unit, for example a process control system. For this reason, it is usually not necessary for the personal computer to have its own input and/or output device which can be applied directly by a user.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The figure illustrates a device for carrying out a method according to an exemplary embodiment of the present invention.

DETAILED DESCRIPTION OF THE EXEMPLARY EMBODIMENTS

A first software program 5, which is developed for a stored-program controller, is read in by a personal computer 10. The first software program 4 may be present here, for example, as a text file in ASCII format or binary format. It can be stored on a data carrier or else be transferred to the personal computer 10 by way of a communications link.

The personal computer 10 may include a compiler 15 which converts the first software program 5 into a second software program 20 which can be executed by the personal computer 10.

The compiler 15 is advantageously embodied here as a compiler.

The first software program 5 may include a program module 35 which is converted into a DLL file 40 by the compiler 15. Furthermore, the first software program 5 contains an organization module 37 which is transformed into an EXE file 45 by the compiler 15.

Input data 25 from the process are provided for connecting to a process to be controlled, and output data 30 are provided for controlling the process.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for executing programmable logic controller (PLC) software programs on a personal computer having redundant components, comprising:

reading a PLC software program developed for a central processor unit of a PLC by way of a compiler included in the personal computer; and converting the PLC software program into a further software program by way of the compiler, the further software program being executable by the personal computer, wherein the PLC software includes at least one data module, wherein a memory module of the PLC, which is formed by the at least one data module, is mapped on the personal computer, wherein the converting by way of the compiler includes executing a translation program that does not change a structure of an instruction included in the PLC software program for accessing one of the at least one data module so that a direct access to data of the memory module which is mapped on the personal computer can be made by means of the instruction, wherein the PLC software program includes at least one program module or functional module, the translation program respectively converts the program module or the functional module into a first type of data code, wherein the first type of data code includes a class of Direct Link Library (DLL) files, and wherein the PLC software program further includes at least one organization module, and the translation program converts the organization module into a second type of data code.

2. The method as claimed in claim 1, wherein the second type of data code includes a class of programs which can be executed directly on the personal computer, the class of programs including at least one of EXE files and BAT files.

3. The method as claimed in claim 1, wherein a plurality of PLC software programs which have been developed for one processor unit of the PLC are converted into corresponding second software programs, each second software program being executed as a separate process on the personal computer.

4. The method as claimed in claim 3, wherein the PLC software programs are provided, before their conversion into the corresponding second software programs, for a plurality of CPUs of corresponding program logic controllers and one file which can be executed directly on the personal computer is generated per CPU by the compiler.

5. The method as claimed in claim 3, wherein sequences of the processes on the personal computer are coordinated by way of at least one semaphore.

6. The method as claimed in claim 3, wherein communication between the processes on the personal computer takes place by way of a pipe or a memory mapped file.

7. The method as claimed claim 1, wherein a cyclically running component of the PLC software program is converted by the translation program into a thread which is included in the further software program.

8. The method as claimed in claim 7, wherein execution of the thread on the personal computer is interrupted, when necessary, by event-controlled components of the further software program.

9. The method as claimed in claim 1, wherein a cyclically running component of the PLC software program is executed on the personal computer after conversion of the PLC software program into the further software program, and after execution of event-controlled components of the further software program.

10. The method as claimed in claim 1, wherein communication takes place between the personal computer and a process control system by way of one of a TCP/IP, an Ethernet communications protocol and a serial interface.

11. The method as claimed in claim 1, further comprising: virtually uninterrupted switching over to a redundant component of the personal computer in the event of a fault in a corresponding hardware component of the personal computer.

12. The method as claimed in claim 11, wherein the personal computer includes a fault tolerant server.

13. The method as claimed in claim 1, wherein the converting includes mapping the PLC software program onto the further software program while preserving structural properties of the PLC software program using the compiler in the personal computer.

14. The method as claimed in claim 1, further including executing the PLC software program on the personal computer by way of a step-by-step translation of control instructions into the further software program without completely translating the PLC software program in advance of the executing.

15. A personal computer comprising:
a compiler configured to read a programmable logic controller (PLC) software program developed for a central processor unit of a PLC,
the compiler being further configured to convert the PLC software program into a further software program executable by the personal computer; and
a central processing unit executing the further software program on the personal computer, the execution of the further software program involving at least one redundant component of the personal computer,
wherein the PLC software includes at least one data module,
wherein a memory module of the PLC, which is formed by the at least one data module, is mapped on the personal computer,
wherein the compiler is configured not to change a structure of an instruction included in the PLC software program for accessing one of the at least one data module so that a direct access to data of the memory module which is mapped on the computer can be made by means of the instruction,
wherein the PLC software program includes at least one program module or functional module, the at least program module or functional module is converted into a first type of data code,
wherein the first type of data code includes a class of DLL files, and
wherein the PLC software program further includes at least one organization module, and the organization module is converted into a second type of data code.

16. The computer as claimed in claim 15, wherein the at least one redundant component includes at least one of another central processing unit, another storage device, another input device and another output device.

* * * * *